United States Patent
Fear et al.

(10) Patent No.: US 7,649,444 B1
(45) Date of Patent: Jan. 19, 2010

(54) POSITIONAL AUDIO CUES FOR AN VEHICLE INDICATOR SYSTEM

(75) Inventors: Andrew C. Fear, Campbell, CA (US); William Samuel Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 352 days.

(21) Appl. No.: 11/300,762

(22) Filed: Dec. 13, 2005

(51) Int. Cl.
*B60Q 1/00* (2006.01)
(52) U.S. Cl. .................. 340/438; 340/435; 340/384.1
(58) Field of Classification Search .......... 340/459, 340/463, 464, 426.24, 903, 438, 435, 436, 340/384.1
See application file for complete search history.

(56) References Cited

U.S. PATENT DOCUMENTS

| | | | |
|---|---|---|---|
| 4,528,563 A * | 7/1985 | Takeuchi | 340/903 |
| 6,087,961 A * | 7/2000 | Markow | 340/902 |
| 6,097,285 A * | 8/2000 | Curtin | 340/436 |
| 6,684,176 B2 * | 1/2004 | Willins et al. | |
| 6,731,204 B2 * | 5/2004 | Lehmann | 340/435 |
| 6,778,073 B2 * | 8/2004 | Lutter et al. | 340/435 |
| 6,876,298 B2 * | 4/2005 | Litkouhi et al. | 340/435 |
| 7,188,005 B2 * | 3/2007 | Toba et al. | 340/438 |

\* cited by examiner

*Primary Examiner*—Jeffery Hofsass (57) ABSTRACT

Embodiments of the present invention recite a method and system for providing positional audio cues for an vehicle warning system. In one embodiment, a sensor disposed in a vehicle detects a warning event and generates a corresponding signal. In response to receiving the signal, a controller uses a positional audio algorithm to generate an audible warning via an audio system associated with the vehicle. The audible warning uniquely identifies the warning event and provides a location cue indicating the location of the warning event. In embodiments of the present invention, a sensor coupled with the controller may detect the proximity of and external object with reference to the vehicle and generate a corresponding signal. In embodiments of the present invention, the audible warnings may comprise steering cues indicating a desired direction, or a wrong direction, to a destination in response to input from a vehicle navigation system.

22 Claims, 6 Drawing Sheets

POSITIONAL AUDIO CUES FOR AN VEHICLE INDICATOR SYSTEM

FIELD OF THE INVENTION

Embodiments of the present invention are related to the field of indicator and driver cue devices for automobiles.

BACKGROUND OF THE INVENTION

Today's vehicles utilize a variety of sensors to monitor operating conditions of the vehicle and to provide feedback to the driver, especially when an unsafe operating condition is detected. Indicators may include fuel level warnings, car navigation signals, door ajar indicators, speedometer speed limits, etc. Typically, this feedback comprises a warning light, an audible warning (e.g., a warning tone or buzzer), or a combination of the two. However, this feedback can be confusing and/or an unwanted distraction to the driver and may result in unsafe operation of the vehicle while the driver determines the problem indicated by the feedback.

For example, when the oil pressure is below a minimum parameter, an oil pressure warning light provides feedback to the driver. Typically, these warning lights are in the drivers peripheral field of vision. Thus, the driver can see that a warning light is illuminated, but cannot determine what condition is being reported unless he directs his/her vision off of the road and to the warning light. In so doing, the driver is no longer able to concentrate on driving the vehicle which can result in reduced reaction time to traffic conditions and/or emergencies.

Alternatively, when a passenger's seatbelt is not fastened, a warning tone may provide an audible indication which requires the driver's attention. Sometimes, the audible tone may be in conjunction with a warning light being illuminated. Again, the driver may not be presented with enough information to quickly determine what the problem is and may become distracted from operating the vehicle.

Consequently, conventional vehicle warning systems often fail to provide a driver with a sufficient amount of information concerning a warning condition in a manner that does not distract the driver from operating the vehicle.

SUMMARY OF THE INVENTION

Embodiments of the present invention are directed to a method and system for providing positional audio cues for a vehicle warning system. In one embodiment, a controller is coupled with an audio generation system and with at least one sensor of the vehicle. The controller utilizes a positional audio algorithm to generate a positional (e.g., 3 dimensional) audible signal via the audio generation system that uniquely identifies a warning or informational event detected by the at least one sensor and the location thereof. The positional sound may also change to indicate the type of warning where the location of the sound may indicate the warning location of interest relative to the driver.

As an example, if a passenger in the right rear seat of a car has not fastened his/her seatbelt, an embodiment of the present invention may generate an audible warning to the driver that a seatbelt is not fastened. The positional audio tone indicates the location of the seat which is not fastened. In embodiments of the present invention, this may comprise a verbal communication, or a unique tone that indicates to the driver that a seatbelt is not fastened. In embodiments of the present invention, the controller utilizes a positional audio algorithm which modifies the parameters of the audio system so that one or more occupants of the vehicle perceives that the audible warning is coming from a particular direction. Thus, the driver can determine that a seatbelt is not fastened and, due to the positional audio cue, the driver can localize which of the seatbelts in the vehicle is not fastened. Furthermore, this information is presented in a manner which does not necessitate that the driver direct his/her attention away from the road.

In embodiments of the present invention, in addition to generating a positional audio tone, the controller may also cause the audio system to generate noise cancellation signals via the positional audio algorithm so that certain occupants of the vehicle are prevented from hearing the audible warning.

In embodiments of the present invention, the controller may be coupled with an external sensor system which, for example, detects the proximity of objects with reference to the vehicle. For example, if the driver is backing the car into a parking space, a proximity sensor (e.g., a light-based, or sound-based ranging system) can detect whether the driver is getting too close to an external object (e.g., a fire hydrant, or another vehicle). The associated positional audio tone may then convey location information regarding the object. Thus, the controller may cause the audio system to generate a warning which indicates to the driver that he is getting too close to an external object and the direction in which the object is located.

In embodiments of the present invention, the controller may also be coupled with a vehicle navigation system. Thus, when the driver has entered a destination into the navigation system, an embodiment of the present invention may generate positional audible steering cues which help the driver reach his/her destination. For example, when a driver comes to an intersection, an embodiment of the present invention may generate a "positive" directional sound indicating the direction in which the vehicle should be steered to reach the destination. An embodiment of the present invention may also generate "negative" directional sounds which indicate to the driver the directions in which the vehicle should not be steered in order to reach the destination. In embodiments of the present invention, this may also include generating a negative directional sound if the driver indicates an incorrect turn using the vehicle's turn signal.

Embodiments of the present invention also include a calibration process to localize the position of the driver's head within the vehicle to more accurately convey positional cues using the positional audio algorithm. In embodiments of the present invention, the position information of the driver's head (e.g., height) is stored so that, for example, if the driver's seat is moved or adjusted after calibration, the positional audio algorithm can continue to provide accurate positional cues to the driver.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

NOTATION AND NOMENCLATURE

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "generating," "utilizing," "establishing," "storing," "accessing," "using" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
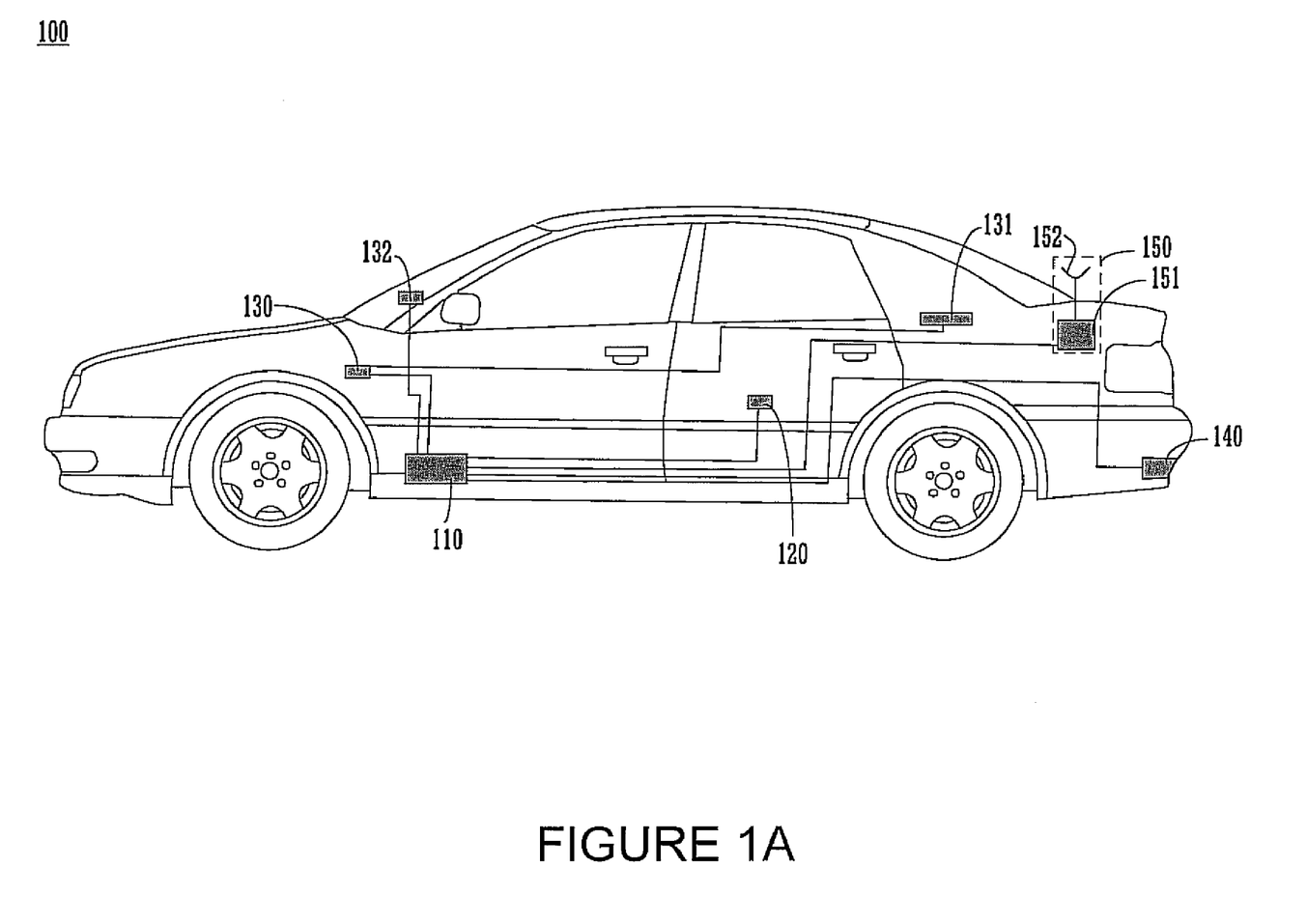
FIGS. 1A and 1B are side and top views respectively of an exemplary vehicle using a system for providing positional audio cues for an vehicle warning/information system in accordance with embodiments of the present invention.

FIG. 1A shows an exemplary vehicle 100 using a system for providing positional audio cues for an vehicle warning or information system in accordance with embodiments of the present invention. In FIG. 1A, a controller 110 is coupled with at least one sensor 120 and with an audio system (e.g., radio 130 and speakers 131). It is noted that while FIG. 1A only shows one sensor for clarity, currently manufactured automobiles typically monitor a wide variety of functions with sensors that may be coupled with controller 110 in embodiments of the present invention. Similarly, it is noted that currently manufactured automobiles typically couple two or more speakers 131 with radio 130.

Also shown in FIG. 1A is an proximity sensor 140 that is coupled with controller 110. In embodiments of the present invention, proximity sensor 140 may utilize sound or light range sensing to determine when external objects are proximate to vehicle 100. As shown in FIG. 1A, proximity sensor 140 is disposed to detect an object behind vehicle 100. However, in embodiments of the present invention, one or more proximity sensors 140 may typically be disposed in locations of vehicle 100 to detect objects in any horizontal direction with reference to vehicle 100. In embodiments of the present invention, proximity sensor 140 may be operable to detect moving or stationary objects. Additional proximity sensors 140 may also be disposed on the front and sides of vehicle 100.

Also shown in FIG. 1A is a vehicle navigation system 150 comprising a receiver 151 and an antenna 152. In embodiments of the present invention, navigation system 150 may be operable to receive navigation signals from satellite based navigation transmitters, terrestrial based navigation transmitters, or from both. In embodiments of the present invention, receiver 151 is operable for processing raw data comprising these navigation signals and for determining a geographic position of vehicle 100 in response thereto. However, in embodiments of the present invention, this processing may be performed by controller 110.

In operation, when sensor 120 detects a warning event, it generates a signal to controller 110. In embodiments of the present invention, in response to receiving the signal from sensor 120, controller 110 automatically generates an audible warning via the audio system of vehicle 100. As will be discussed in greater detail below, in embodiments of the present invention, controller 110 utilizes a positional audio algorithm to generate the audible warning using positional sounds. The audible warning provides a unique identification of the warning event, thus unambiguously informing the driver of vehicle 100 of the warning event taking place and the position thereof. Additionally, because the driver receives an audible warning, it is not necessary for the driver to divert his/her attention from driving the vehicle. Furthermore, embodiments of the present invention utilize the positional audio algorithm to provide the driver with a location cue which indicates the direction in which the warning event is occurring. As a result, the driver can quickly localize the event being reported without the necessity of diverting his/her attention from driving the vehicle (e.g., without looking at a gauge or warning indicator).

Figure 1B:
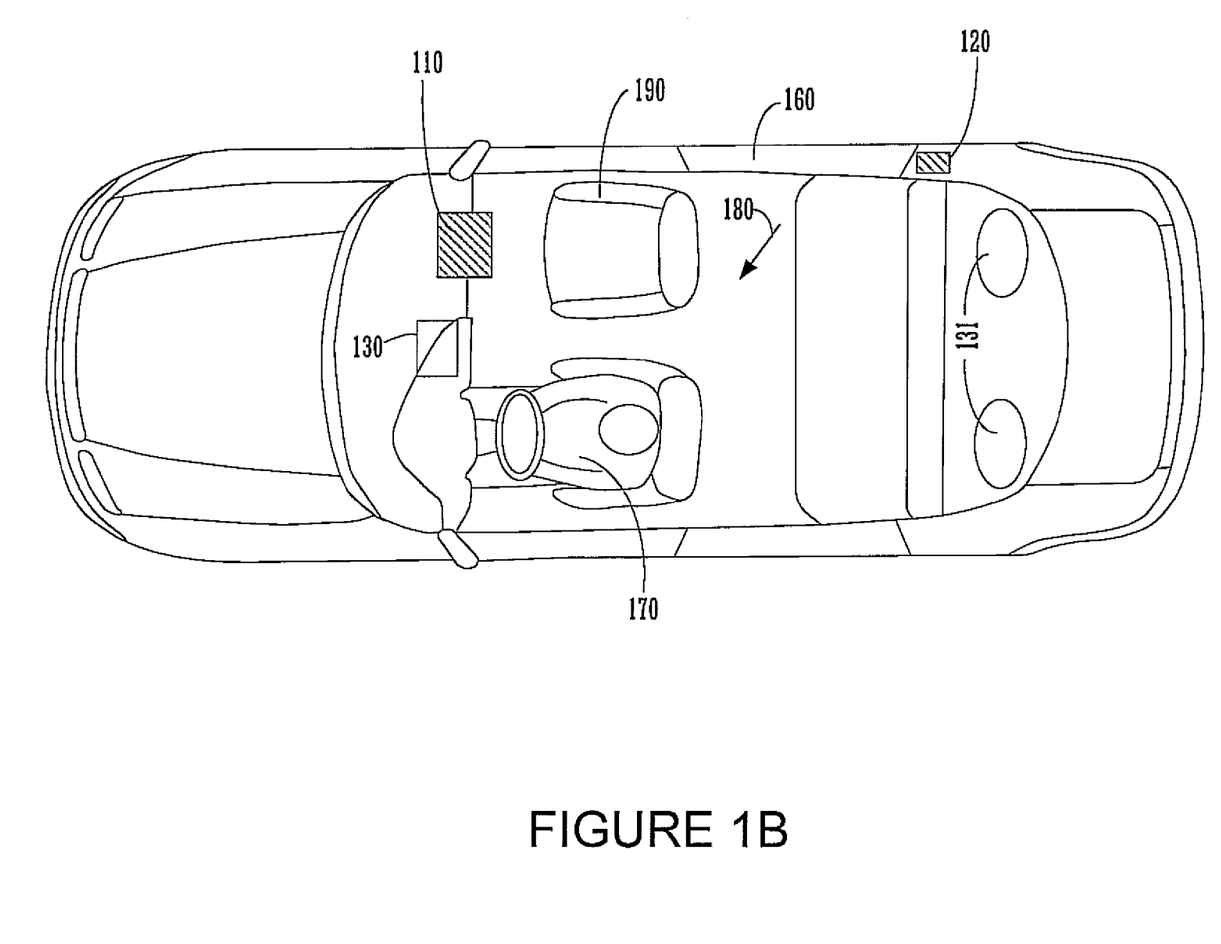

As an example, with reference now to FIG. 1B, if the right rear door of vehicle 100 (e.g., door 160) is not completely closed, a sensor that monitors the 120 position of door 160 will generate a signal that door 160 is ajar. Upon receiving that signal, controller 110 causes the positional audio algorithm to generate an audible warning to the driver of vehicle 100 (e.g., 170). The audible warning informs driver that door 160 is ajar. In the present example, the positional audio algorithm generates a signal that causes radio 130, or any other audio generator, to generate the positional audible warning via speakers 131.

In embodiments of the present invention, the audible warning may comprise a sound or tone that uniquely identifies the particular warning event, or may comprise a verbal message. The audible warning may interrupt programming that is being played by radio 130, or may be generated concurrently (e.g., by lowering the volume of any concurrent radio broadcast). Additionally, a verbal message may specify which door is ajar. Furthermore, the positional audio algorithm generates a positional or directional tone by modifying the playing parameters of the audio system such that driver 170 of vehicle 100 perceives the audible warning as coming from the direction (e.g., typically represented by arrow 180) of door 160 rather than from either, or both, of speakers 131.

In embodiments of the present invention, a noise cancellation signal may also be generated which prevents, for example, passengers of vehicle 100 from substantially hearing the audible warning. For example, because the acoustic parameters of vehicle 100 are relatively static, it is possible for embodiments of the present invention to determine signals which will cause destructive interference (e.g., nodes and anti-nodes) to the audible warning at the seat positions within vehicle 100. Thus, in embodiments of the present invention, while generating the audible warning which is heard by the driver of vehicle 100, controller 110 may simultaneously generates a noise cancellation signal which comprises destructive interference of the audible warning to other passengers of vehicle 100. For example, a passenger in seat 190 would hear the noise cancellation signal rather than the audible warning, or a directional cue thereof, which is heard by driver 170.

Figure 2:
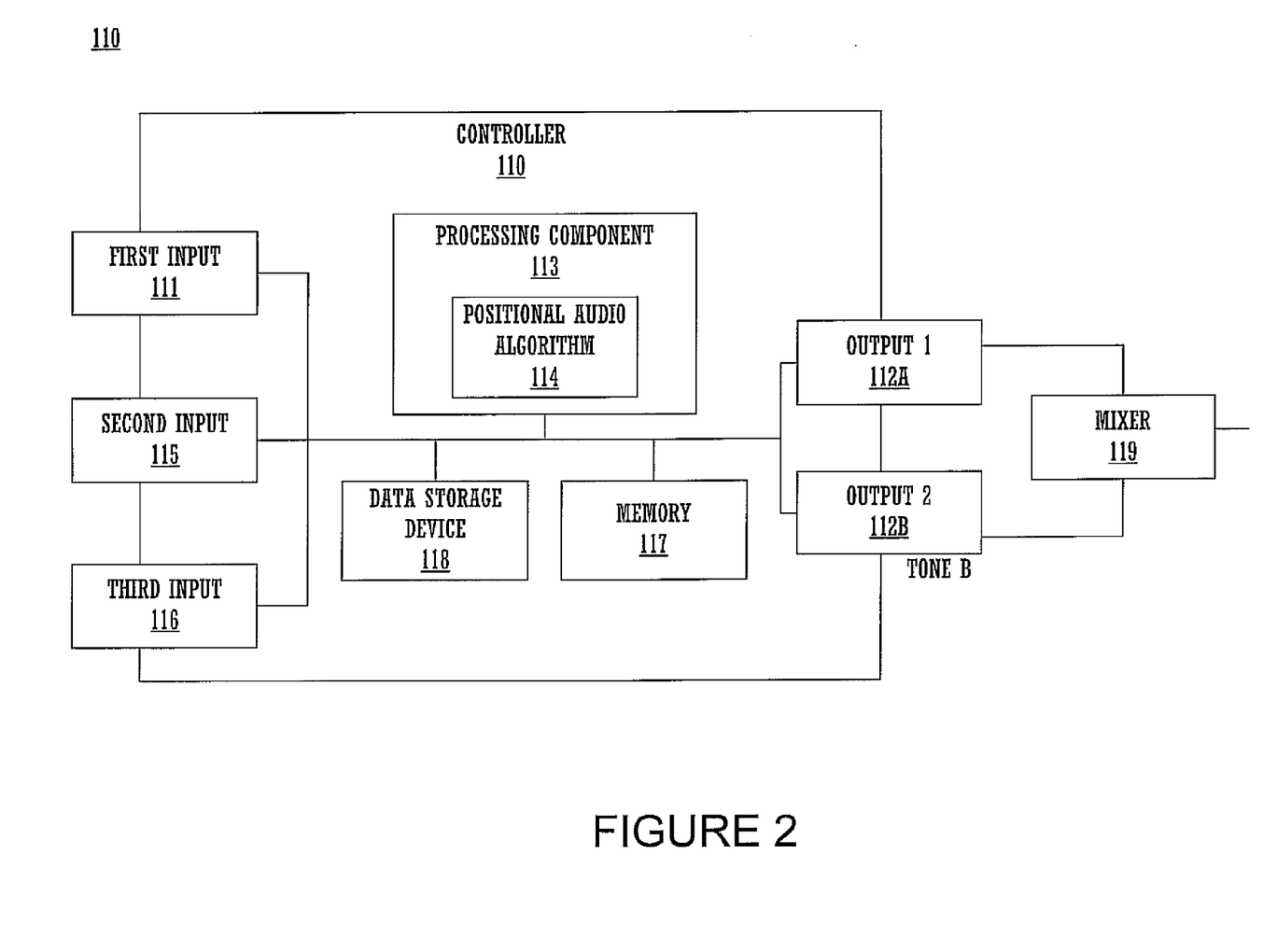
FIG. 2 is a block diagram of an electronic controller for a system for providing positional audio cues for an vehicle warning system in accordance with embodiments of the present invention.

FIG. 2 is a block diagram of a controller 110 for a system for providing positional audio cues for an vehicle warning system in accordance with embodiments of the present invention. In FIG. 2, a first input 111 is coupled with a processing component 113. In embodiments of the present invention, first input 111 comprises an input from an internal sensor (e.g., 120 of FIG. 1A) of a vehicle. It is appreciated that while FIG. 2 shows one input from an internal sensor of vehicle 100, that a plurality of internal sensor inputs may be coupled with controller 110 in embodiments of the present invention. Processing component 113 is for processing computer-readable and computer-executable instructions for providing audio cues for an vehicle warning system in accordance with embodiments of the present invention. In the embodiment of FIG. 2, a positional audio algorithm 114 is executed by processing component 113.

Positional audio algorithms are typically used to modify the playing parameters of audio systems such that the listener perceives that the sound is coming from a source other than the audio system's speakers. By emulating the various spatial cues that a listener's brain uses to process sounds, the listener perceives the impression that the sound is coming from a particular direction and distance. Positional audio algorithms typically can use spatialization cues as to whether the sound source is moving, is outdoors or indoors, as well as the characteristics of objects around the listener. In embodiments of the present invention, positional audio algorithm 114 may modify spatialization cues including, but not limited to, interaural intensity difference, interaural time distance, early reflections, reverb wash, and head related transfer functions.

In operation, in response to receiving a signal from a particular sensor, processing component 113 automatically determines the location and type of warning event represented by the signal. Processing component 113 then uses positional audio algorithm 114 to generate a positional audible warning of the event which is conveyed to, for example, radio 130. In another embodiment, the audible warning may be sent from controller 110 directly to speakers 130.

As will be described in greater detail below, embodiments of the present invention may generate a first audible warning, indicating a correct course of action, and a second audible warning which indicates an incorrect course of action. In embodiments of the present invention, positional audio algorithm uses the formula below to indicate the degree of "correctness" of a particular action:

$$A(1-\alpha)+B\alpha=\text{output signal}$$

In the equation above, A represents a tone indicating an incorrect course of action, B represents a tone indicating a correct course of action, and $\alpha$ indicates of the degree of correctness of an action (e.g., 0%-100% correct). For example, assume a situation where a reaches an intersection where making a right turn is a correct course of action in order to reach a destination, while a left turn is an incorrect course of action. Thus, a left turn is 0% correct and is therefore represented by tone A. A right turn is 100% correct and is therefore represented by tone B. Using the equation above, tone A is conveyed in a manner that indicates to driver 170 that a left turn at this intersection is the incorrect course of action.

Similarly, tone B is conveyed in a manner that indicates to driver 170 that a right turn is the correct course of action at this intersection. In embodiments of the present invention, conveying the "correctness" of a course of action, or incorrect course of action, may comprise changing the volume of a first or second audible signal, changing the pitch of a first or second audible signal, generating a first sound for a correct course of action and a second sound for an incorrect course of action, generating a first voice for a correct course of action and a second voice for an incorrect course of action, * or a combination thereof.

Returning to FIG. 2, outputs 112a and 112b are coupled with processing component 113. In embodiments of the present invention, each of outputs 112a and 112b may comprise a separate amplifier. Furthermore, output 112a corresponds to the portion of the equation above in which $A(1-\alpha)$. Similarly, output 112b corresponds to the portion of the equation above in which $B\alpha$. In FIG. 2, outputs 112a and 112b are coupled with a mixer 119 which combines the signals and sends them to the speakers disposed in vehicle 100.

In the embodiment of FIG. 2, controller 110 further comprises a memory 117 (e.g., a volatile random access memory (RAM) device) for storing the digital information and instructions and a data storage device 118 (e.g., a non-volatile read only memory (ROM) device) for storing information and instructions of a more permanent nature. Also shown in FIG. 2 is a second input 115. In embodiments of the present invention, proximity detection system 140 may be coupled with controller 110 via second input 115. It is noted that in embodiments of the present invention, input from the proximity detection system 140 may be received by controller 110 via first input 111.

In response to receiving an indication of an external object, controller 110 generates a positional audible warning informing driver 170 of the presence of that object. Because processing component 113 utilizes positional audio algorithm 114 to generate the audible warning, driver 170 also receives a location cue which indicates the location of the object to driver 170. In embodiments of the present invention, the object may be a stationary object such as a tree, fire hydrant, or a parked car. Additionally, in embodiments of the present invention, the object may be a moving object such as another vehicle, pedestrian, or animal. Thus, driver 170 may be informed of a potential impact with the object, and the relative location of the object, in a manner that does not necessitate that the driver has to look away from the road.

Also shown in FIG. 2 is a third input 116 from vehicle navigation system 150. As described above, vehicle navigation system 150 may be used to determine the present geographic position of vehicle 100. Additionally, many vehicle navigation systems are operable for providing map displays and/or directions to destinations designated by driver 170. In embodiments of the present invention, navigation data from vehicle navigation system 150 may be accessed by controller 110 in order to provide steering cues to driver 170 based upon the current geographic position of vehicle 100 and an indicated destination. For example, navigation system 150 may, upon reaching an intersection, determine that vehicle 100 should make a right turn in order to reach a destination. In embodiments of the present invention, controller 110 uses this information to generate a positional audible warning or cue that provides a steering cue to driver 170. More specifically, positional audio algorithm 114 may modify the parameters of the signal between radio 130 and speakers 131 such that the positional audible warning appears, to driver 170, to be originating in the direction of the right turn. Additionally, controller 110 may generate other audible warnings that indicate to driver 170 a wrong steering direction for vehicle 100. For example, a second positional audible warning which indicates a wrong direction may be generated by positional audio algorithm 114 such that it appears to driver 170 that the second audible warning originates in the current direction of travel and/or the direction of a left turn. In so doing, embodiments of the present invention provide driver 170 with spatially localized steering cues which differentiate a desired direction to a destination as well as one or more wrong directions to the destination.

As discussed above, the determination of the proper direction to take may originate from, but is not limited to, a map algorithm of a computerized GPS navigation system. However, other inputs which indicate a turning event may also be used by controller 110 when generating a positional audible warning to driver 170. For the purposes of the present invention, the term "turning event" means the detection of an actual change in direction of vehicle 100, or the indication of an impending change in the direction of vehicle 100. For example, a sensor (not shown) coupled with the turn indicator of vehicle 100 may monitor whether driver 170 is indicating an impending left turn or an impending right turn. If the desired direction to the destination is a right turn, and driver 170 is indicating an impending left turn, controller 110 may generate a positional audible warning to driver 170 which lets driver 170 know that a left turn is the wrong course of action to take in order to reach the destination. In another embodiment, a sensor coupled with the steering wheel of vehicle 100 detects the direction in which the steering wheel is being turned. Using this information, controller 110 can determine whether vehicle 100 is being steered in a direction which leads to the destination. If vehicle 100 is being steered in a wrong direction, controller 110 may generate a directional audible warning to driver 170 indicating that the present turn is in the wrong direction, as well as a directional audible cue indicating the correct direction to the destination. In other embodiments, a gyroscope coupled with controller 110 may indicate whether vehicle 100 is being steered in a correct or incorrect direction relative to the destination and a positional audible cue may be generated as a result. Using these indicators may be advantageous in a situation where the refresh rate of a navigation system, or its visual display, is so low that it does not provide driver 170 information in a timely manner.

In embodiments of the present invention, calibration of the positional audio system may be performed so that spatialization of warning events is accurately conveyed to driver 170. This may involve determining the driver's head position. For example, driver 170 may focus on a certain point of the dashboard (e.g., a light, or gauge) and adjust the calibration of the positional audio system so that a noise or signal appears to come from that point. In embodiments of the present invention, the calibration parameters (e.g., driver's height) may be saved and associated with the seat position settings for the driver's seat of vehicle 100 (e.g., in memory 117). Thus, if driver 170 uses a pre-set system which stores the seat position settings for a particular driver, the calibration parameters for that driver can be accessed when the driver recalls the seat position settings.

In embodiments of the present invention, head tracking system 132 determines the location and/or orientation of the driver's 170 head. Head tracking systems are commercially available which utilize a camera, or other image capture device, and an algorithm to detect a person's head and determine the orientation thereof. In embodiments of the present invention, head tracking system 132 is used to indicate to controller 110 when driver 170 has moved the location and/or orientation of their head. In so doing, the parameters of the positional audible warnings or cues generated by controller 110 can be modified such that driver 170 still continues to perceive the correct direction of the warning when his/her head is turned. In other words, the direction of the audible warning will not appear to shift when driver 170 turns his/her head.

Figure 3:
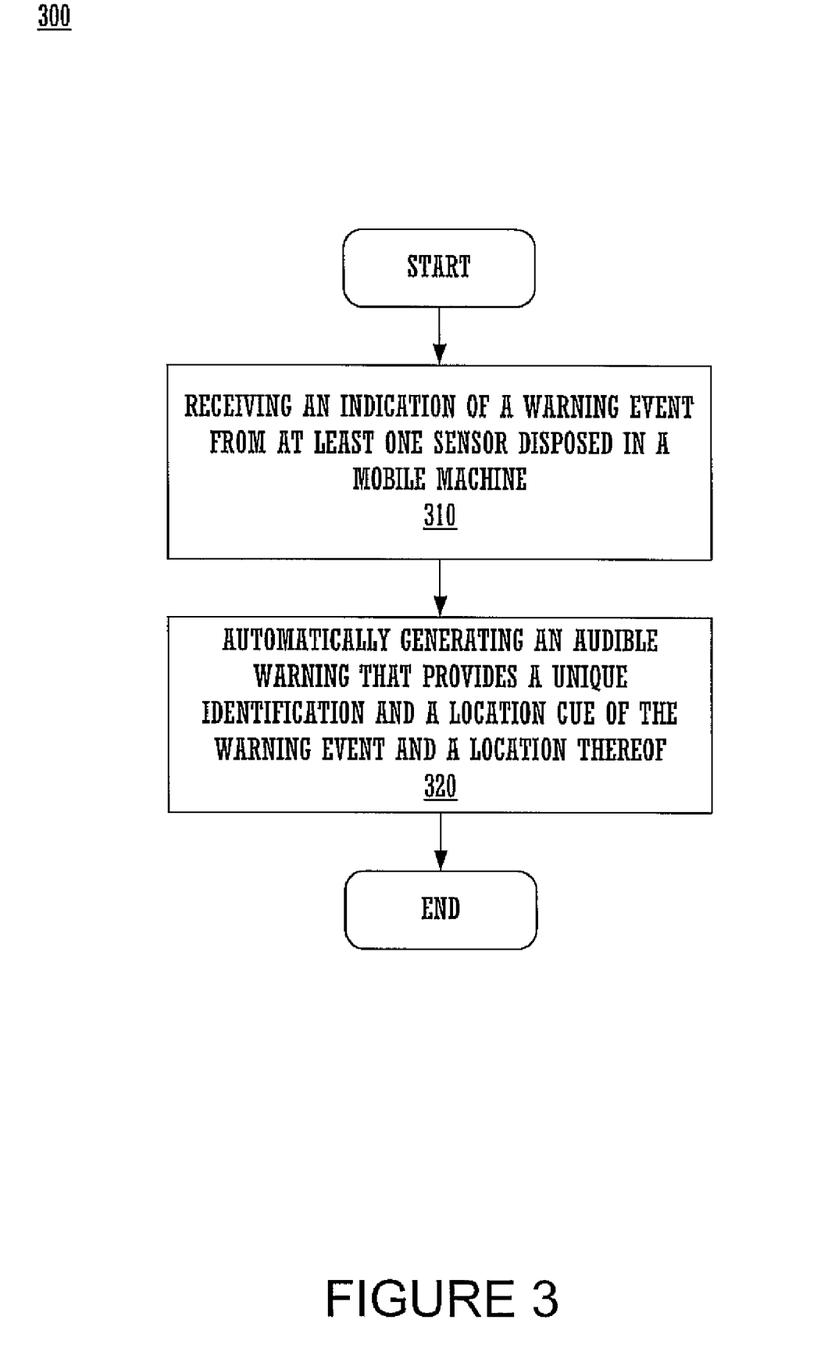
FIG. 3 is a flowchart of a method providing positional audio cues for an vehicle indicator system in accordance with embodiments of the present invention.

FIG. 3 is a flowchart of a method 300 providing positional audio cues for an vehicle warning system in accordance with embodiments of the present invention. In step 310 of method 300, an indication is received of a warning or informational event from at least one sensor disposed in a vehicle. As described above, in embodiments of the present invention, controller 110 receives an indication of a warning event from one or more sensors disposed in vehicle 100. In embodiments of the present invention, this may comprise an event occurring within vehicle 100, outside of vehicle 100, or may comprise vehicle navigation information, for instance.

In step 320 of method 300, a positional audible warning is automatically generated in response to receiving the indication that provides a unique identification and a location cue of the warning event and a location thereof. In embodiments of the present invention, controller 110 uses positional audio algorithm 114 to generate an audible warning that informs the driver of vehicle 100 of the warning event. Utilizing a positional audio algorithm allows embodiments of the present invention to localize a direction and/or location of the warning event without the driver needing to look away from the road while operating vehicle 100. As a result, embodiments of the present invention facilitate operating vehicle 100 safely and efficiently. For example, driver 170 can receive audible steering cues indicating the right or wrong direction of travel. Typically, this level of information is currently conveyed to the driver visually, using a display screen coupled with a vehicle navigation system. As a result, the driver needs to look away from the road in order to look at the display. This can be unsafe, especially when the vehicle is moving. Additionally, if the driver is in an area with which he is not familiar, there will be a tendency for him to look at the display more frequently to ensure that he is still traveling in the desired direction. However, because the driver can receive spatially localized steering cues using embodiments of the present invention, the necessity to look at the display is reduced or eliminated entirely.

Figure 4A:
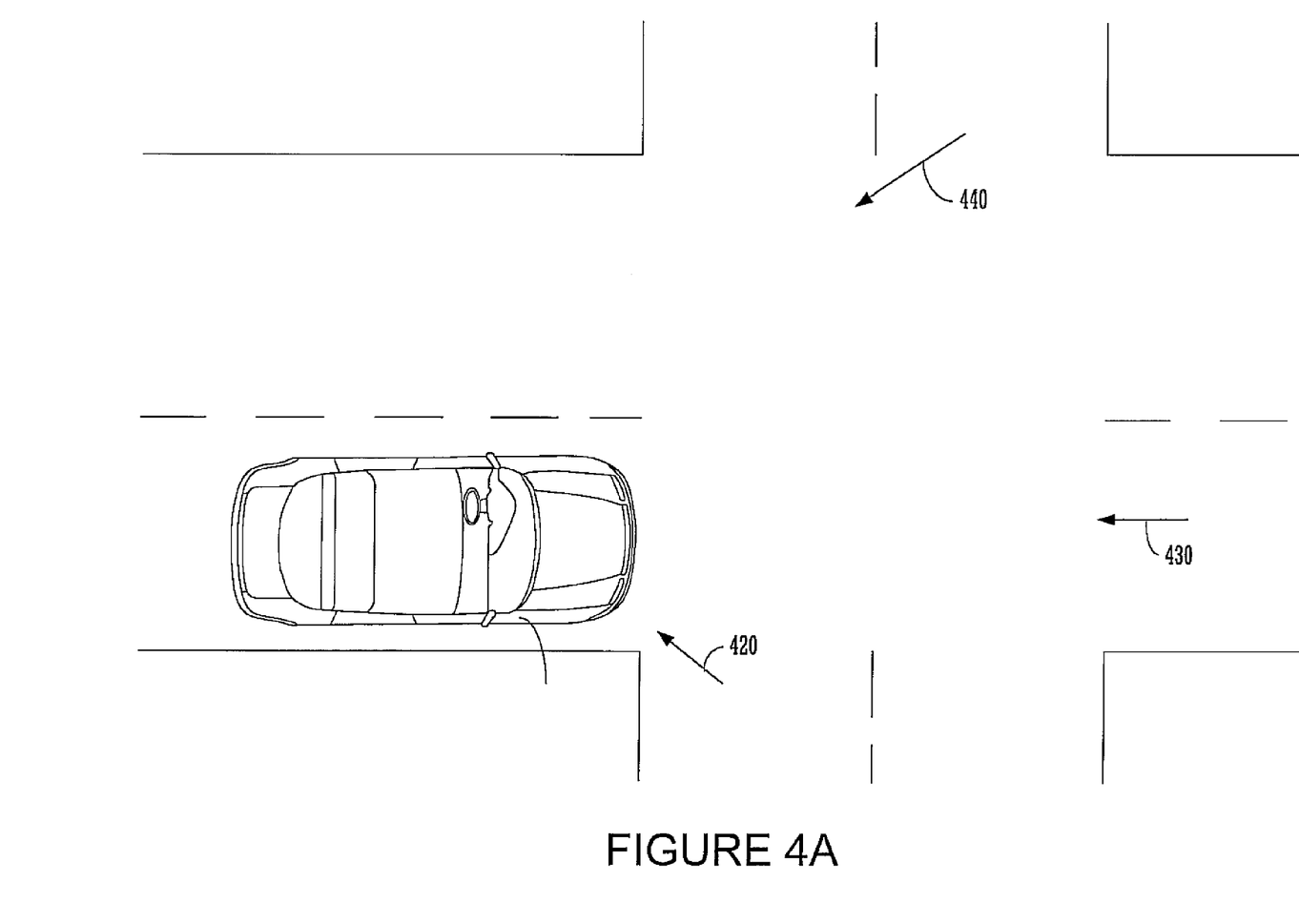
FIG. 4A shows an exemplary intersection and a vehicle using a system for providing positional audio cues for an vehicle indicator system in accordance with embodiments of the present invention.

FIG. 4A shows an exemplary intersection and a vehicle using a system for providing positional audio cues for an vehicle warning system in accordance with embodiments of the present invention. In FIG. 4A, vehicle 100 is at an intersection 410 and can subsequently travel in any of three possible directions (e.g., directions 420, 430, and 440) by driving down one of three possible lanes of traffic (e.g., 420a, 430a, and 440a respectively). In the embodiment of FIG. 4A, the driver of vehicle 100 has designated a destination using a vehicle navigation system (e.g., 150 of FIG. 1A). As a result, when vehicle 100 reaches intersection 410, the vehicle navigation system determines that a right turn (e.g., direction 420) into lane 420a is the desired direction to get vehicle 100 to the destination. Thus, directions 430 and 440 are wrong directions for guiding vehicle 100 to the destination.

Figure 4B:
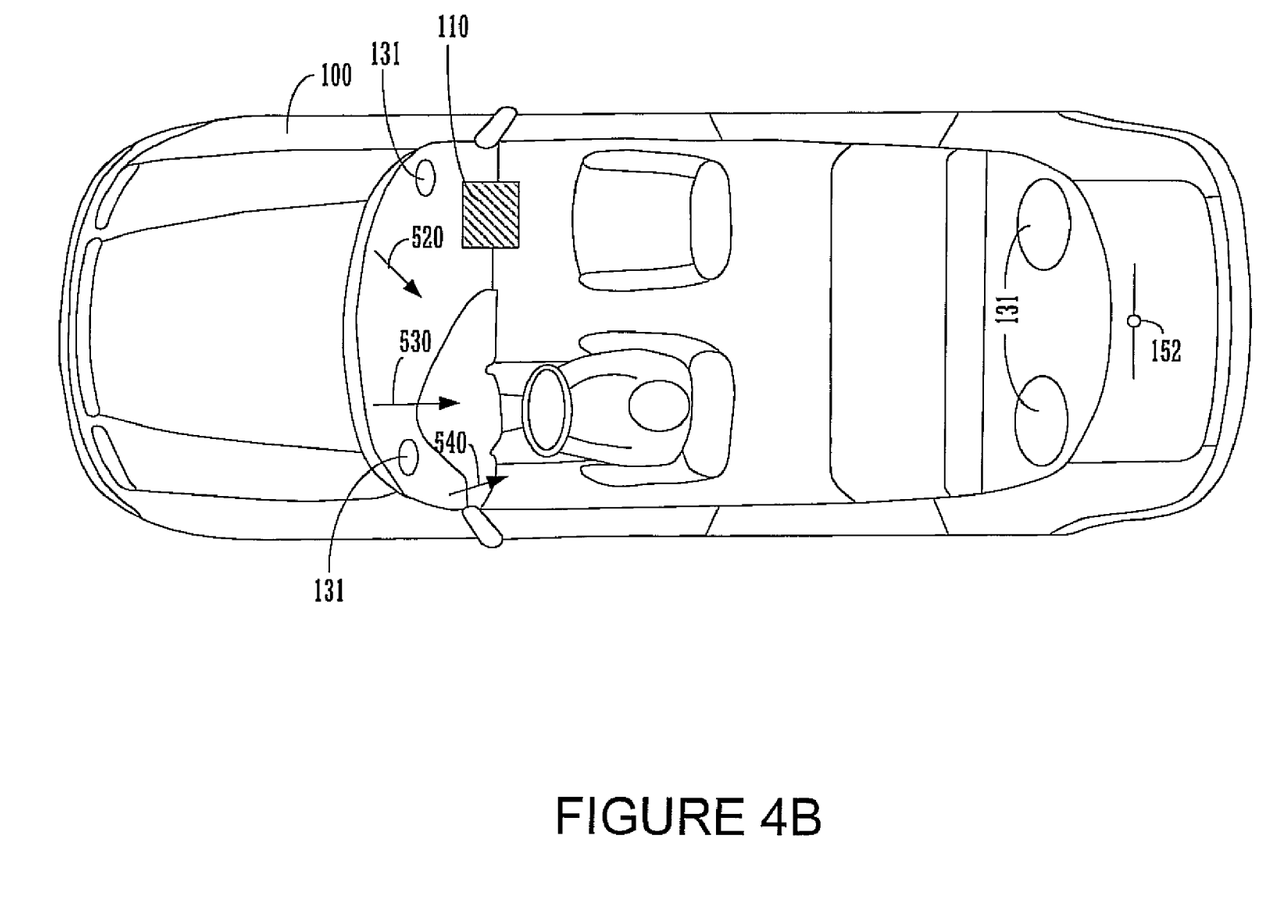
FIG. 4B is a top view of a vehicle showing the projection of steering cues in accordance with embodiments of the present invention.

FIG. 4B is a top view of a vehicle showing the projection of steering cues in accordance with embodiments of the present invention. In embodiments of the present invention, controller 110 generates a positional audible warning 520, via speakers 131, comprising a steering cue which indicates the desired direction for vehicle 100. In embodiments of the present invention, the steering cue may be a tone or sound which is uniquely associated with the "correct" direction in which to steer vehicle 100. Alternatively, the steering cue may be a verbal message telling driver 170, "Turn right at this intersection." It is noted that in embodiments of the present invention, the steering cue may only be generated when vehicle 100 approaches, or is at, an intersection.

Additionally, controller 110 may optionally generate two audible warnings (e.g., 530 and 540) which indicate the wrong direction in which to steer vehicle 100. It is noted that audible warnings 530 and 540 are associated with directions 430 and 440 of FIG. 4A respectively. It is well known in the art that GPS navigation systems are capable of determining the location of an object with a degree of precision measured in centimeters. Thus, vehicle navigation system 150 may determine the location of vehicle 100, as well as some entry point to each of lanes 420a, 430a, and 440a, within a few centimeters. As a result, vehicle navigation system 150, or controller 110 may determine each of the directions (e.g., 420, 430, and 440 of FIG. 4A) for steering vehicle 100 into one of the respective car lanes. Additionally, by accessing the location of the head of driver 170 relative to, for example, antenna 152, controller 110 may determine the direction, relative to the head of driver 170, in which each of the steering cues should be projected. In embodiments of the present invention, a sensor may monitor the turn signal of vehicle 100. If the driver indicates a turn in the direction away from the desired direction, controller 110 may initiate an audible warning which tells the driver that he is about to turn in the wrong direction.

The preferred embodiment of the present invention, positional audio cues for an vehicle warning/informational system, is thus described. While the present invention has been described in particular embodiments, it should be appreciated that the present invention should not be construed as limited by such embodiments, but rather construed according to the following claims.

What is claimed is:

1. A system for providing positional cues for a vehicle, said system comprising:
    an audio generation system disposed within said vehicle, wherein said audio generation system comprises at least two speakers;
    at least one sensor associated with said vehicle for detecting an event and for generating a corresponding signal in response thereto; and
    a controller coupled with said audio generation system and with said at least one sensor, said controller for utilizing a positional audio procedure to generate an audible warning via said audio generation system operable to create a perception that said audible warning is associated with a position other than respective positions of said two speakers, wherein said audible warning provides a unique identification and a location cue indicating said warning event and a location thereof, and wherein said audible warning is generated automatically in response to receiving said corresponding signal.

2. The system of claim 1 further comprising a reference system coupled with said controller, said reference system for determining a reference location within said vehicle used for modifying at least one parameter of said positional audio procedure wherein said location cue is generated relative to said reference location.

3. The system of claim 2 wherein said positional audio procedure is further for generating a cancellation signal which prevents hearing of said audible warning in at least one location within said vehicle away from said reference location.

4. The system of claim 2 further comprising a head tracking system coupled with said controller, wherein said head tracking system is for determining that the head position of at least one person in said vehicle has changed and wherein said controller modifies at least one parameter of said positional audio procedure such that said location cue continues to indicate the location of said warning event.

5. The system of claim 1 wherein said at least one sensor is a proximity detector coupled with said controller for indicating the proximity of an external object with reference to said vehicle and wherein said audible warning indicates said external object and a location cue indicating a location thereof.

6. The system of claim 1 further comprising a vehicle navigation system coupled with said controller and wherein said audible warning provides a steering cue indicating a desired direction to a destination.

7. The system of claim 6 wherein said controller further generates a second audible warning substantially concurrent with the generation of said audible warning and wherein said second audible warning provides a second steering cue indicating a wrong course of action for reaching said destination.

8. A method for providing positional cues in an vehicle indicator system, said method comprising:
    receiving an indication of an event from at least one sensor associated with a vehicle; and
    in response to said indication, automatically generating an audible warning operable to create a perception that said audible warning is associated with a position other than respective positions of speakers of said vehicle indicator system, wherein said audible warning provides a unique identification of said event and a location cue indicating a location thereof.

9. The method as recited in claim 8 wherein said automatically generating said audible warning further comprises:
utilizing a positional audio procedure to modify a parameter of an audio system associated with said vehicle.

10. The method as recited in claim 9, wherein said method further comprises:
establishing a reference location within said vehicle which is used by said positional audio procedure;
storing a correlation between said reference location and a first seat position of a seat within said vehicle; and
accessing said correlation when said seat is moved to a second seat position wherein a second reference location is established.

11. The method as recited in claim 10, wherein said method further comprises:
generating a cancellation signal which prevents hearing of said audible warning in at least one location within said vehicle different from said reference location.

12. The method as recited in claim 10, wherein said method further comprises:
receiving an indication that the head of at least one person in said vehicle has changed; and
modifying at least one parameter of said positional audio procedure such that said location cue continues to indicate the location of said warning event to said person.

13. The method as recited in claim 8 wherein said receiving said indication comprises receiving an indication of the proximity of an external object with reference to said vehicle.

14. The method as recited in claim 8 wherein said receiving said indication comprises receiving vehicle navigation data to a destination and wherein said method further comprises:
receiving an indication of a turning event; and
using said audible warning to provide a steering cue indicating a desired direction to said destination.

15. The method as recited in claim 14 wherein said method further comprises:
receiving an indication of an incorrect turning event; and
generating a second audible warning to provide a second steering cue indicating that said incorrect turning event is an incorrect course of action relative to said destination and wherein said generating said second audible warning is substantially concurrent with said generating said audible warning.

16. A controller for a vehicle indicator system, said controller comprising:
a first input for receiving an indication of an indication event from at least one sensor disposed on said vehicle;
an output to an audio generation system comprising at least one speaker which is associated with said vehicle; and
a processing component coupled with said first input and with said output, said processing component for generating a positional audible signal via said audio generation system operable to create a perception that said positional audible signal is associated with a position other than a position of said one speaker, wherein said positional audible signal provides a unique identification of said indication event and a location cue indicating a location of said indication event, and wherein said positional audible signal is generated automatically in response to receiving said indication.

17. The controller of claim 16 wherein said processing component utilizes a positional audio procedure to modify a parameter of said audio generation system.

18. The controller of claim 16 wherein said processing component is for establishing a reference location within said vehicle which is used by said positional audio procedure and is further for storing a correlation between said reference location and a first seat position of a seat within said vehicle.

19. The controller of claim 18 wherein said processing component further utilizes said positional audio procedure to generate a cancellation signal which prevents hearing said positional audible signal in at least one location within said vehicle away from said reference location.

20. The controller of claim 16 wherein said indication is of the proximity of an external object with reference to said vehicle.

21. The controller of claim 16 further comprising a second input for receiving vehicle navigation data and wherein said processing component provides a steering cue indicating a desired direction to a destination using said positional audible signal.

22. The controller of claim 21 wherein said processing component provides a second steering cue indicating a wrong course of action relative to said destination using a second positional audible signal which is generated substantially concurrent with said steering cue indicating said desired direction.

* * * * *